United States Patent
Tkabladze

(10) Patent No.: US 10,698,129 B2
(45) Date of Patent: Jun. 30, 2020

(54) X-RAY GENERATOR REGULATION WITH HIGH ENERGY TAIL WINDOWS

(71) Applicant: Schlumberger Technology Corporation, Sugar Land, TX (US)

(72) Inventor: Avtandil Tkabladze, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 204 days.

(21) Appl. No.: 15/996,655

(22) Filed: Jun. 4, 2018

(65) Prior Publication Data
US 2018/0284317 A1    Oct. 4, 2018

Related U.S. Application Data

(63) Continuation of application No. 14/965,396, filed on Dec. 10, 2015, now Pat. No. 10,007,024.

(51) Int. Cl.
  *G01V 5/10* (2006.01)
  *H01J 35/12* (2006.01)
  *G01V 5/12* (2006.01)

(52) U.S. Cl.
  CPC ............... *G01V 5/125* (2013.01); *G01V 5/12* (2013.01)

(58) Field of Classification Search
  CPC . G01V 5/08; G01V 5/125; G01V 5/12; G01N 2223/616; G01N 23/06; G01N 23/2252; G01N 23/203; G01N 2223/076; G01N 2223/20; H01J 35/00
  See application file for complete search history.

(56) References Cited

U.S. PATENT DOCUMENTS

| 4,524,273 A | 6/1985 | Hubner |
| 6,649,914 B1 | 11/2003 | Moorman et al. |
| 7,654,948 B2 | 2/2010 | Kaplan et al. |
| 7,668,293 B2 * | 2/2010 | Wraight ............... H01J 35/06 378/89 |

(Continued)

FOREIGN PATENT DOCUMENTS

| GB | 2444801 A | 6/2008 |
| WO | WO2012050725 A2 | 4/2012 |

OTHER PUBLICATIONS

International Search Report and written opinion issued in the related PCT application PCT/US2016/064494, dated Feb. 6, 2017 (8 pages).

(Continued)

*Primary Examiner* — Don K Wong
(74) *Attorney, Agent, or Firm* — Trevor G. Grove

(57) ABSTRACT

The techniques and device provided herein relate to regulating a source generator in X-ray based measurement for downhole applications. A source stream of photons is produced, via a generator of an X-ray system of a logging tool. A direct channel allows for the passage of a stream of photons, where a high energy filter filters a low energy part of the stream of photons. The resultant stream is measured by a reference detector to identify a high energy peak in a spectrum measurement derived based upon the resultant photon stream. From there, a normalized difference between a plurality of windows of the high energy peak is determined and subsequent output of the generator is based upon the normalized difference.

20 Claims, 5 Drawing Sheets

(56) References Cited

U.S. PATENT DOCUMENTS

| | | |
|---|---|---|
| 7,960,687 B1 | 6/2011 | Simon et al. |
| 7,991,111 B2 | 8/2011 | Wraight et al. |
| 9,541,670 B2 | 1/2017 | Groves et al. |
| 2007/0274443 A1 | 11/2007 | Groves et al. |
| 2009/0161823 A1 | 6/2009 | Groves et al. |
| 2011/0002443 A1 | 1/2011 | Wraight et al. |
| 2011/0112810 A1 | 5/2011 | Scoullar et al. |
| 2011/0191027 A1 | 8/2011 | Pfutzner et al. |
| 2014/0355737 A1 | 12/2014 | Korkin et al. |
| 2017/0168193 A1 | 6/2017 | Tkabladze |
| 2017/0169909 A1 | 6/2017 | Tkabladze et al. |

OTHER PUBLICATIONS

International Search Report and written opinion issued in the related PCT application PCT/US2016/065001, dated Sep. 7, 2016 (10 pages).

The Extended European Search Report issued in the corresponding EP Application 16873630.4, dated Jun. 6, 2019 (8 pages).

International Preliminary Report on patentabilitiy issued in the related PCT application PCT/US2016/065001, dated Jun. 12, 2018 (6 pages).

International Preliminary Report on Patentability issued in the related PCT application PCT/US2016/064494, dated Jun. 12, 2018 (6 pages).

\* cited by examiner

X-RAY GENERATOR REGULATION WITH HIGH ENERGY TAIL WINDOWS

CROSS REFERENCE TO RELATED APPLICATION

This application is a continuation of application Ser. No. 14/965,396, filed Dec. 10, 2015.

BACKGROUND

The disclosure relates to an apparatus and method of electronic X-ray generator output regulation. More specifically, this disclosure relates to making the regulation process with simplified design of dedicated reference detector block. In addition, the regulation scheme is independent of electron beam spot position on the target material where the photon emission occurs.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous well logging tools are used to identify characteristics of geological formations where wells are drilled. For example, properties such as a density and/or photoelectric factors of the formation may be measured by downhole well-logging tools.

Traditionally, radioisotopic sources, such as radiocaesium (e.g., Caesium-137 (Cs-137) have been used for density measurement in well-logging tools. Indeed, radioisotopic sources may provide a stable flux output and relatively high energy of source photons that are suitable for consistent density measurement. Unfortunately, however, the use of chemical sources in a well-logging application may be undesirable, as strict operational standards and procedures may regulate such practices. These regulations may add operational burdens to downhole development. Accordingly, new non-chemical methods that provide reliable density measurements may be desirable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure relate to using X-ray measurement to determine density measurements and/or photoelectric factors of a well formation, by downhole well-logging tools. More particularly, the current embodiments relate to stabilization of an electron photon generator used in X-ray measurement by regulating the source strength based upon filtered spectrum data of a reference detector of the X-ray measurement system.

Some embodiments relate to a method that comprises producing a stream of photons via an X-ray generator; passing a portion of the stream of photons through a direct channel that connects the X-ray generator to a reference detector; identifying a high energy peak in a spectrum measured by the reference detector; and defining a subsequent output of the X-ray generator based upon an analysis of the high energy peak.

Some embodiments relate to a system comprising an X-ray generator, a reference detector that is connected to the X-ray generator via a direct channel, and a controller that regulates a subsequent output of the X-ray generator based upon an analysis of a high energy peak in a spectrum measured by the reference detector. In some embodiments, the system is a downhole logging tool.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made } to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Many downhole tools used for logging new wells obtain measurements of the formation supporting the wells. As mentioned above, traditional density measurement systems for downhole tools may use highly-regulated chemical processes for obtaining formation density measurements that may provide increased operational burdens. Accordingly, this disclosure describes systems and methods that may stabilize source X-ray source energies, such that X-ray technology may facilitate downhole density and/or photoelectric factor measurements.

Figure 1:
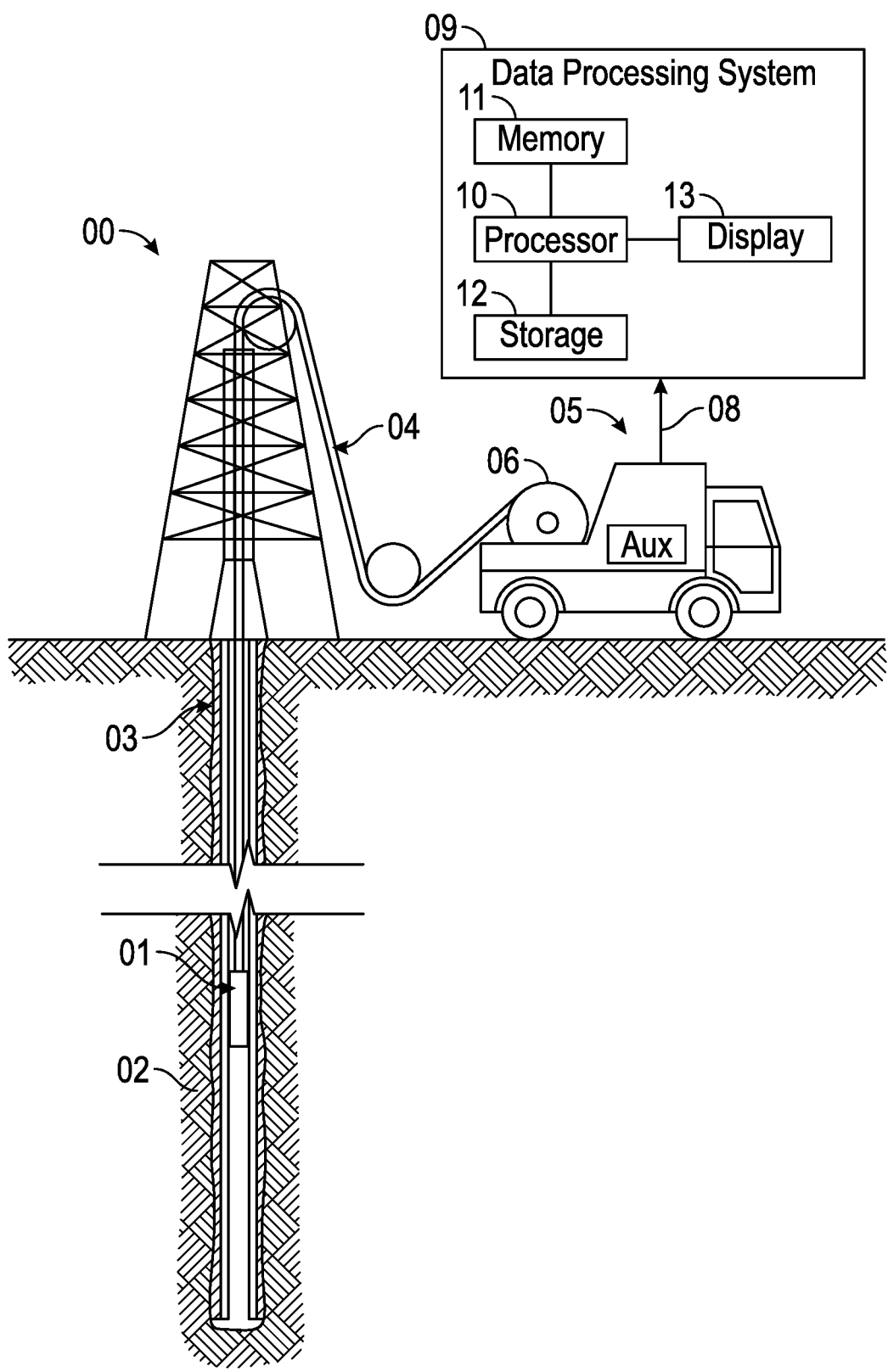
FIG. 1 is a schematic diagram of a well-logging system that uses a source-regulated X-ray equipped well-logging tool, in accordance with an embodiment.

With this in mind, FIG. 1 is a schematic diagram illustrating a well-logging system 00 that may obtain logging measurements, using an X-ray system 12, where the X-ray system 12 is regulated based upon filtered spectrum data, as described in more detail below. The well-logging system 00 may be conveyed through a geological formation 02 via a wellbore 03. The downhole tool 01 is conveyed on a cable 04 via a logging winch system 05. Although the logging winch system 05 is schematically shown in FIG. 1 as a mobile logging winch system carried by a truck, the logging winch system 05 may be substantially fixed (e.g., a long-term installation that is substantially permanent or modular). Any suitable cable 04 for well logging may be used. The cable 04 may be spooled and unspooled on a drum 06 and an auxiliary power source 07 may provide energy to the logging winch system 05 and/or the downhole tool 01.

Although the downhole tool 01 is described as a wireline downhole tool, it should be appreciated that any suitable conveyance may be used. For example, the downhole tool 01 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 01 may be any suitable measurement tool that obtains multidimensional measurements through depths of the wellbore 03.

Many types of downhole tools may obtain measurements in the wellbore 03. For each depth of the wellbore 03 that is measured, the downhole tool 01 may generate density and/or photoelectric factor measurements at the various depths of the wellbore 03.

The downhole tool 01 may provide such measurements 08 to a data processing system 09 via any suitable telemetry (e.g., via electrical signals pulsed through the geological formation 02 or via mud pulse telemetry). The data processing system 09 may process the measurements 08 to identify patterns in the measurements 08. The patterns in the multidimensional measurements 08 may indicate certain properties of the wellbore 03 (e.g., porosity, permeability, relative proportions of water and hydrocarbons, and so forth) that would be otherwise indiscernible by a human operator.

To this end, the data processing system 09 thus may be any electronic data processing system that can be used to carry out the systems and methods of this disclosure. For example, the data processing system 09 may include a processor 10, which may execute instructions stored in memory 11 and/or storage 12. As such, the memory 11 and/or the storage 12 of the data processing system 09 may be any suitable article of manufacture that can store the instructions. The memory 11 and/or the storage 12 may be ROM memory, random-access memory (RAM), flash memory, an optical storage medium, or a hard disk drive, to name a few examples. A display 13, which may be any suitable electronic display, may provide a visualization, a well log, or other indication of properties of the wellbore 03 based on the multidimensional measurements 08.

Figure 2:
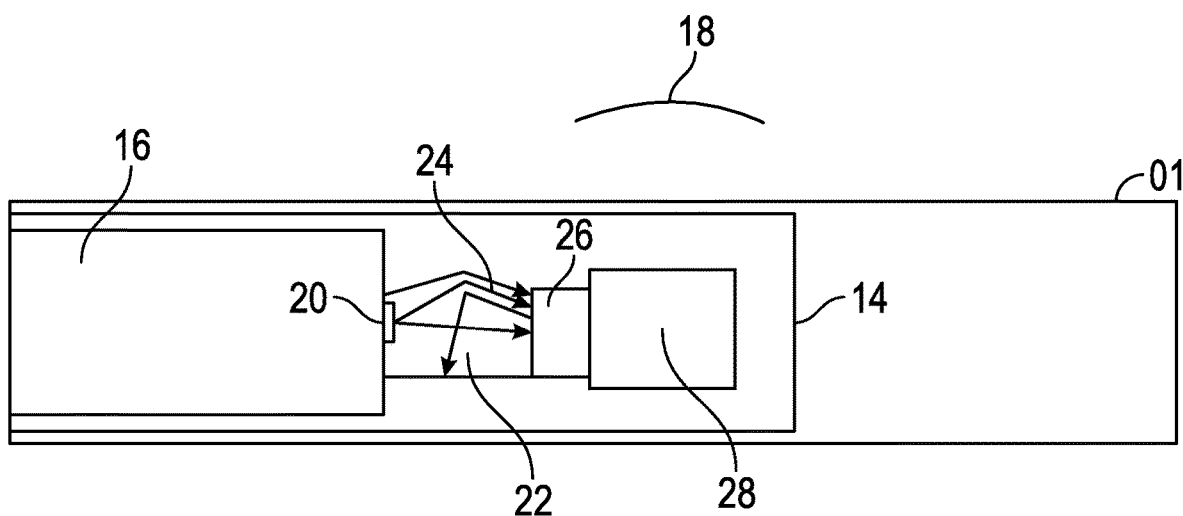
FIG. 2 is a schematic diagram of a well-logging tool that may obtain logging measurements using an X-ray system that is regulated based upon filtered spectrum data, in accordance with an embodiment.

Turning now to a detailed discussion of the well-logging tool 01, FIG. 2 is a schematic diagram of a well-logging tool 01 that may obtain logging measurements. As mentioned above, non-chemical measurement systems may provide certain benefits in downhole operations. Accordingly, the current well-logging tool 01 is equipped with an X-ray system 14 that operates a source 16 (e.g., an X-ray generator) at high voltage (e.g., more than 250 keV). To avoid instability of the source of the X-ray system 14, the X-ray system is regulated based upon filtered spectrum data, in accordance with an embodiment.

As mentioned above, the X-ray generator (e.g., source 16) can be used in downhole applications to obtain density and photoelectric factor measurements for the formation 02. To measure downhole density and/or photoelectric factors, the downhole well-logging tool 01 uses the source 16 to provide gamma rays and a measurement detector to detect gamma rays. Emitted photons from the source 16 undergo interaction with formation 02 elements, causing the photons to scatter or be absorbed by the formation 02. Some of the scattered photons return back to the detector (or multiple detectors) mounted in the logging tool 01. The density and photoelectric factors are derived from the photon counts that are observed at the detectors.

The principle of an electronic X-ray generator (e.g., source 16) and detector is based on the so-called bremsstrahlung effect. The high energy electrons traveling in the electromagnetic field emit photons when they strike a target 20. The emitted photon spectrum is rather broad, and the energy is less than the incident electron energy. The target 20 thickness is large enough to stop the incident electron beam.

Unfortunately, unlike radioisotopic sources, the output of generator source 16 may not be stable. Fluctuation of high voltage and electron beam current can change the energy spectra of emitted photons. In other words, both the energy and the intensity of source 16 photons can vary. If the source strength is not regulated, additional uncertainty is introduced in the count rates of measured photons, as the number of sourced photons may vary over time. Indeed, the amount of photons reaching the detectors after passage through the formation 02 depends on the energy of photons emitted by source 16 into the formation in proportion to the flux intensity. Accordingly, as may be appreciated, the accuracy of the formation 02 density measurement can suffer significantly as the strength and intensity of the photon source varies. Therefore, the accuracy of the density measurements may be vastly improved by regulating the output of the source 16. The accuracy of the regulation depends on the specification of the measurement.

One mechanism for regulating the X-ray generator (e.g., source 16) high voltage and beam current may utilize a portion of the photons that travel through the logging tool 01. This portion of photons may be detected by a dedicated reference detector 18. If the reference detector 18 and the path of source photons from the radiation target 20 to this detector 18 are properly shielded, the spectrum of detected photons is independent from environmental variables and can be used for generator source 16 regulation.

As illustrated in FIG. 2, the generator source 16, generator target 20, and reference detector 18 are contained inside the logging tool 01. The reference detector 18 is shielded, such that the scattered photons produced from the borehole or formation 02 cannot reach it. In the current embodiment, a special filter 22 is positioned between the target 20 and the reference detector 18. In some embodiments, the filter 22 may be manufactured from a high density and high Z (e.g., high atomic number) material, like tungsten, lead, or any heavy material. The high density and high z material may act to attenuate photons effectively, resulting in scattered photons produced from the borehole or formation 02 not reaching the reference detector 18. For example, the filter 22 may attenuate the low energy part of the source photon spectrum and passes only the high energy tail to the detector 18.

In addition, in the current embodiment, the logging tool 01 includes an indirect path (e.g., channel 24) from the target 20 to a detector crystal 26 of the reference detector 18. The source photons hitting the wall of the channel 24 create a fluorescent emission. The fluorescent peak has relatively low energy. The detector crystal 26 may reduce sensitivity to background radiation, while allowing a photomultiplier tube (PMT) 28 to detect and provide an amount of photons that reach it.

Figure 3:
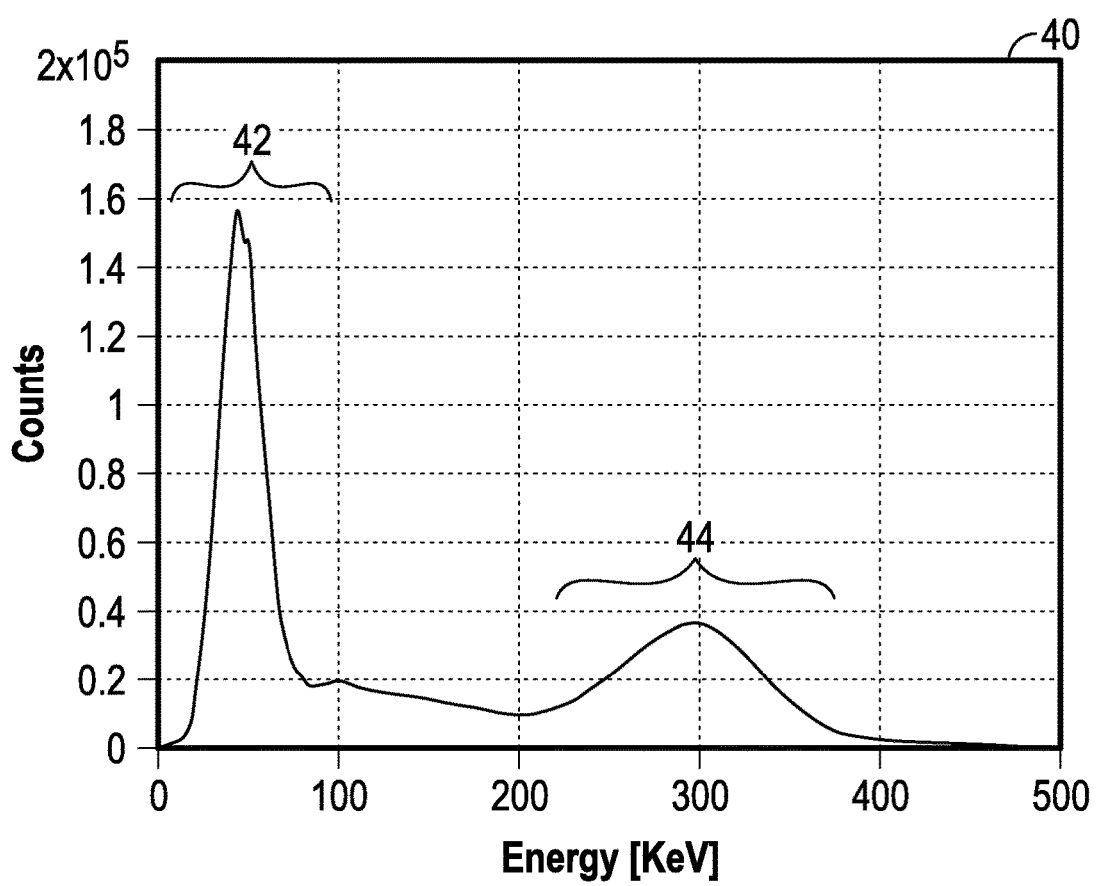
FIG. 3 is a chart illustrating an example of spectrum data obtained via the well-logging tool of FIG. 1, in accordance with an embodiment.

For example, FIG. 3 is a chart illustrating an example of spectrum data 40 obtained via the PMT 28 of the well-logging tool 01 of FIG. 1, in accordance with an embodiment. As illustrated, the final spectrum of detected photons looks like a two peak distribution. The low energy peak 42 is created by the fluorescent photons produced via the channel 24 of FIG. 1. The high energy peak 44 is created by the high energy tail of the initial spectra with the low energy part removed by the filter 22. The total counts of the reference detector 18 are proportional to the electron beam current if the high voltage of the generator source 16 is fixed. Accordingly, the ratio of the count rates in the low energy and high energy windows ($W_{LE}/W_{HE}$) is sensitive to the voltage of the generator source 16 of FIG. 2. Thus, fixing the counts of the low energy and high energy windows of the reference detector 18 may act to stabilize the electron beam current and end-point energy of the generator source 16.

As may be appreciated, this regulation embodiment uses two different paths/channels for source photons to reach the reference detector 18, namely a main channel where the filter 22 is positioned and the fluorescent channel 24. In certain situations, it may be undesirable to use two channels. For example, in some cases, mechanical limitations/restrictions of the logging tool 01 may limit an amount of spacing that is available for source photons. Accordingly, there may not be enough space to provide both the main channel and the fluorescent channels 24. For example, the logging tool 01 diameter may be small or electronic circuitry boards of the logging tool 01 may not leave enough space for two channels. Accordingly, in certain embodiments, the main channel may be used to regulate the source 16 without use of fluorescent channel 24, as will be discussed in more detail below.

Figure 4:
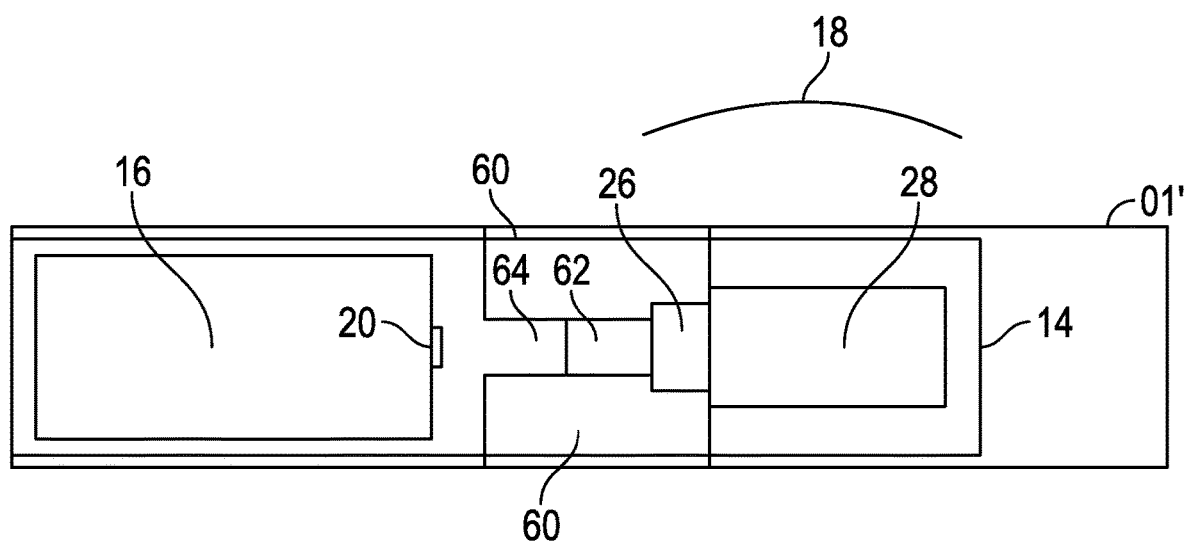
FIG. 4 is a schematic diagram of a well-logging tool that may obtain logging measurements using an X-ray system that is regulated based upon high energy tail data of filtered spectrum data, in accordance with an embodiment.
Figure 5:
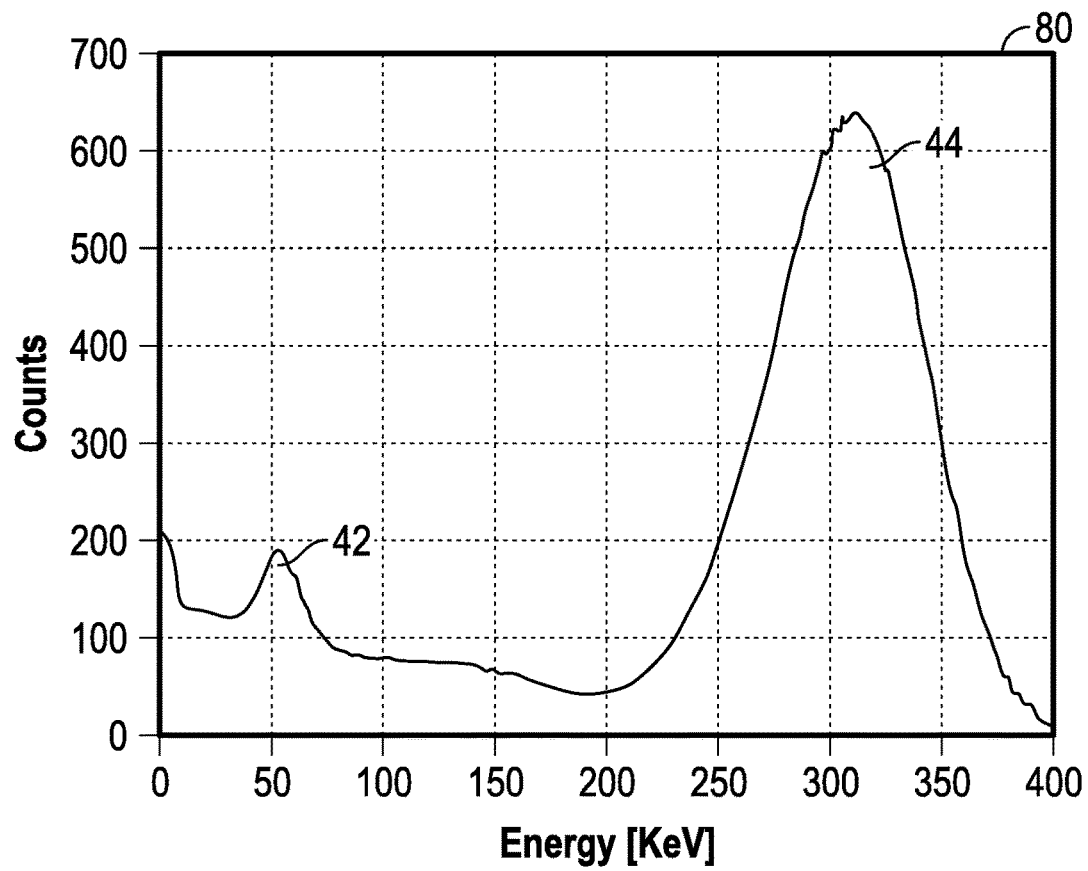
FIG. 5 is a chart illustrating an example of spectrum data obtained via the well-logging tool of FIG. 3, in accordance with an embodiment.

FIGS. 4 and 5 respectively illustrate a logging tool 01' and resultant spectrum data, when fluorescent channel 24 is not used. As may be appreciated, when fluorescent channel 24 is removed from the logging tool 01', low energy peaks (e.g., peak 42 of FIG. 3) may not be present or may be greatly reduced in resultant data obtained via the PMT 28. Accordingly, the techniques discussed below may use only the high energy tail 44 (e.g., as represented by the high energy peak 44 of FIGS. 3 and 5) of the filtered spectrum data for the regulation and/or normalization of the source 16.

This technique is independent on beam spot movement when high energy filter is on axis of electron beam and the detector 18. In addition, this technique can be used when fluorescent channel is present as an additional cross check of the regulation process of X-ray generator source 16 and monitoring of gain stabilization of the reference detector 18.

Turning first to a discussion of the logging tool 01', FIG. 4 is a schematic diagram of a well-logging tool 01' that may obtain logging measurements using an X-ray system 14 that is regulated based upon high energy tail 44 data of filtered spectrum data, in accordance with an embodiment. As illustrated, similar to the logging tool 01 of FIG. 2, the logging tool 01' of FIG. 4 includes the generator source 16, a reference detector 18 having a detector crystal 26 and a PMT 28, and the target 20.

The detector crystal 26 is surrounded by an internal shield 60, which may be manufactured from a heavy material. Further, a heavy metal filter 62 (e.g., a tungsten filter) may be positioned in a direct channel 64 formed in the internal shield 60 that provides a path between the target 20 and the crystal 26. Accordingly, photons may reach the detector 18 only by passing through the heavy metal filter 62. The filter 62 may cut the low energy photons and pass only the high energy part of the initial spectrum to the PMT 28. An example of the resulting spectrum is shown in FIG. 5.

Turning now to a discussion of the resulting spectrum of the logging tool 01', FIG. 5 is a chart illustrating an example of spectrum data 80 obtained via the well-logging tool of FIG. 3, in accordance with an embodiment. As illustrated in the data 80, two peaks (low energy peak 42 (or small fluorescent peak) and high energy peak 44 (or high energy tail)) are visible in the spectrum data 80.

Because a portion of the photons passing the filter interact with the material of the filter 62 (e.g., tungsten), the atoms of the filter 62 may be excited, resulting in a fluorescent emission. Accordingly, even though the logging tool 01' does not include the fluorescent channels 24 of logging tool 01, the fluorescent peak is still visible. However, unlike the fluorescent peak from the channel 24 of FIG. 2, the count rate of this peak is proportional to the counts of high energy tail (e.g., high energy peak 44), as the fluorescent peak is a result of the high energy photons passing through the filter 62.

Figure 6:
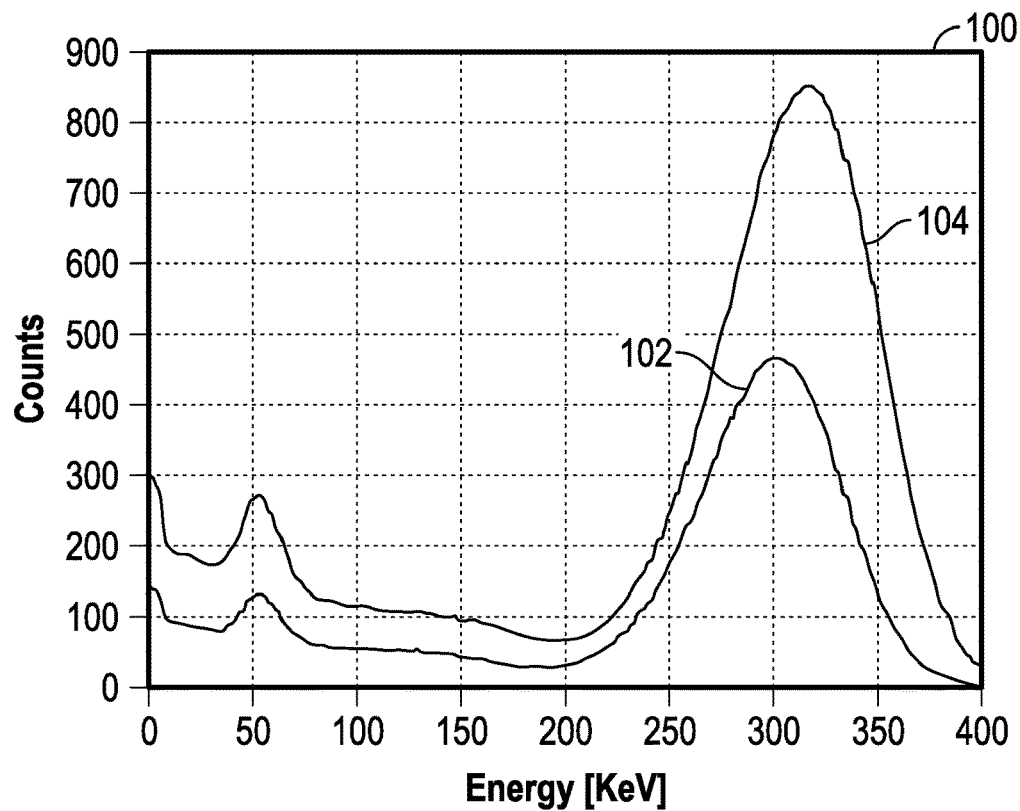
FIG. 6 is a chart illustrating a comparison of spectrum data obtained via the well-logging tool of FIG. 3 using two different end point energies of the X-ray system generator.

The position and counts of the high energy peak 44 depend on the energy of electron beam, or high voltage of the generator source 16. FIG. 6 illustrates a comparison 100 of two spectra, for two end point energies of the generator source 16. The provided spectra utilize a logging tool with a tungsten filter 62 having a 15 mm thickness. The first spectrum 102 illustrates an end point energy of 340 keV. The second spectrum 104 illustrates an end point energy of 360 keV. As illustrated in FIG. 6, the spectra vary for varied energies from the generator source 16.

It may be difficult to define the generator source 16 high voltage using the peak position and count rates under the peak, as it is difficult to accurately define the peak position from the spectra (e.g., 102 or 104). Further, the count rate depends not only on the generator source 16 end point energy but on the beam current as well.

Figure 7:
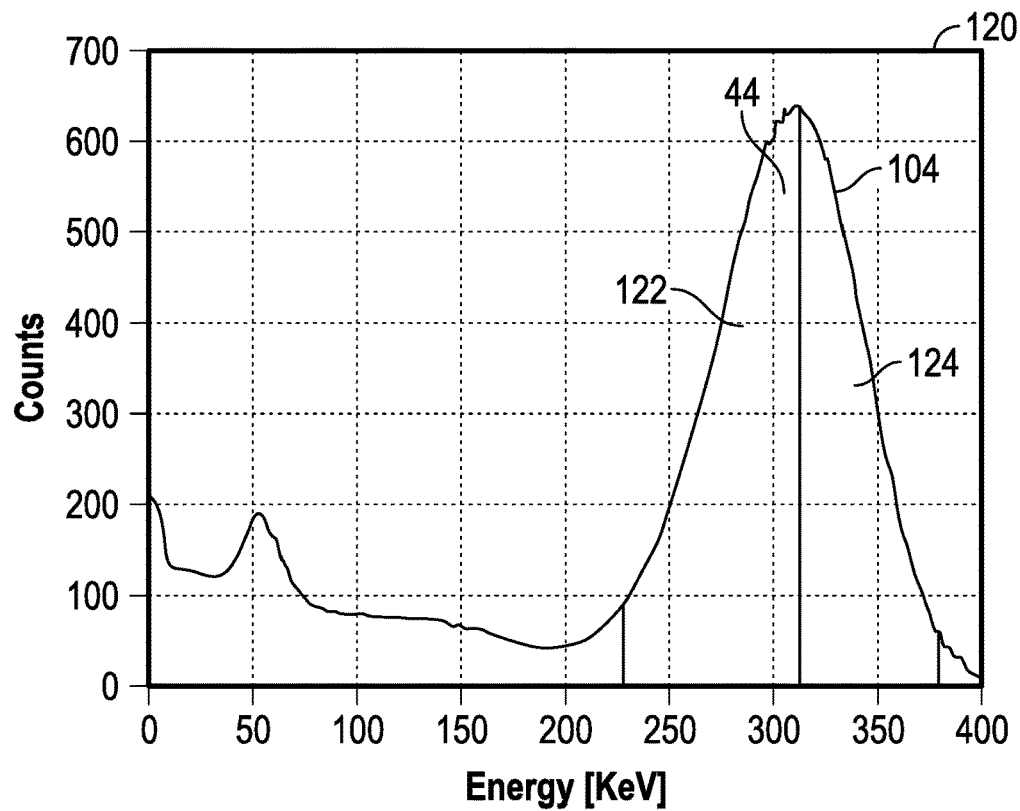
FIG. 7 is a chart illustrating separation of the high energy tail data of FIG. 4 into a plurality of windows, in accordance with an embodiment.

However, by dividing the peak into a plurality of windows, a form factor that is sensitive to the end point energy may be derived. FIG. 7 is a chart 120 illustrating the separation of the high energy tail 44 data of the spectrum 104 of FIG. 5 into a plurality of windows, in accordance with an embodiment. In the example of FIG. 7, the high energy tail 44 data is separated into two windows, left window 122 and right window 124. Counts for the left window 122 are herein referred to as LW and counts for the right window 124 are herein referred to as RW. The generator source 16 high voltage may be defined using the normalized difference as a form factor (FF), defined as:

$$FF = \frac{LW - RW}{LW + RW}$$

Figure 8:
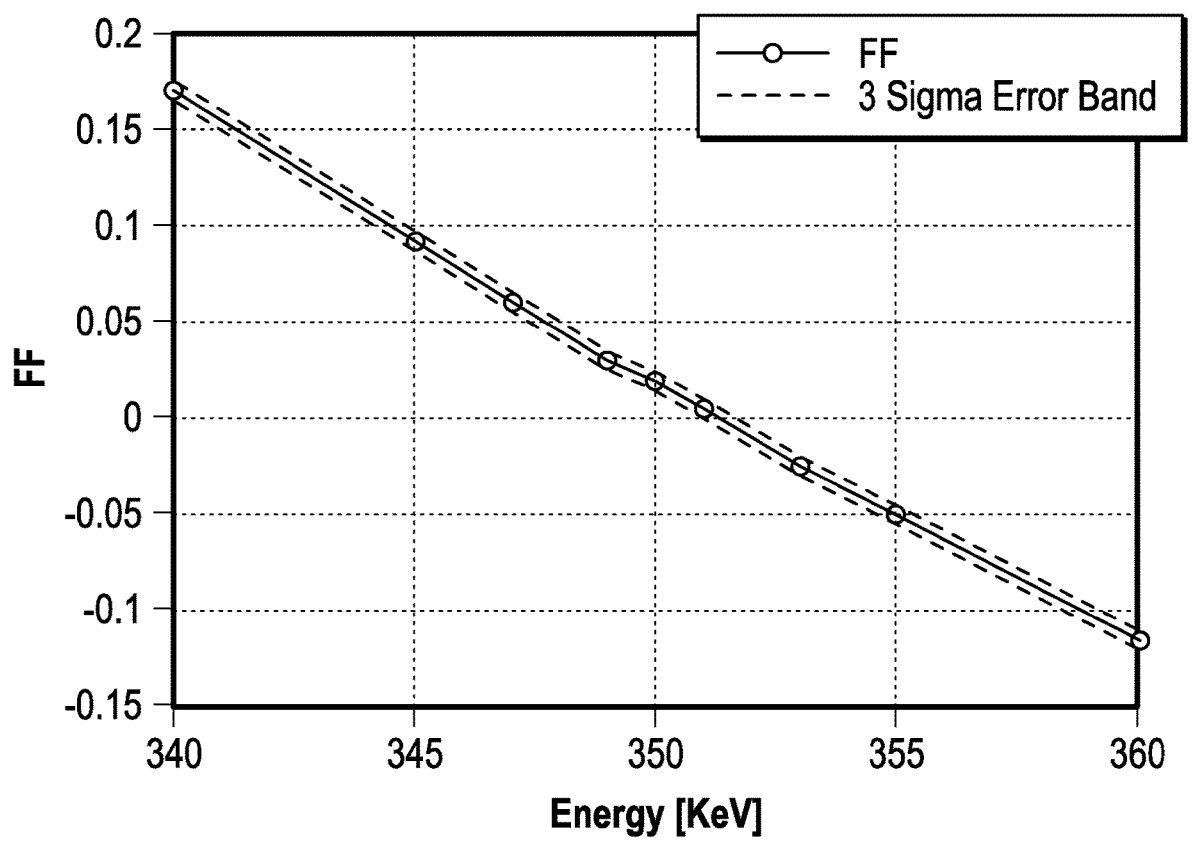
FIG. 8 is a chart illustrating dependence of a form factor on the end point energy of the X-ray system generator, in accordance with an embodiment.

The form factor (FF) may be quite sensitive to the generator source 16 end point energy. The expected statistical error is small, enabling the high voltage to be defined with good precision. For example, FIG. 8 is a chart illustrating dependence of a form factor on the end point energy of the X-ray system generator source 16. As illustrated in the example of FIG. 8, a nominal value 142 and deviation 144 are provided. The deviation 144 from nominal value 142, equivalent to 3 sigma error, is only 0.25 keV. The generator source 16 current is assumed to be 20 µA and the high voltage approximately 350 KeV.

Modifications to the filter 62 may result in sensitivity and reduction of statistical error. For example, increasing the filter 62 thickness may increase the sensitivity, but may also increase statistical errors as well. Further, the filter 62 geometry may be optimized to get smallest statistical error for the high voltage.

The measurements (e.g., the counts) by the detector 18 may be normalized by summing the left window 122 counts (LW) and right window 124 (RW). As soon as generator source 16 high voltage is defined by the normalized difference of two windows (the left window 122 and right window 124), the total count under the peak is proportional to the electron beam current.

However, the detector 18 gain may affect the spectrum and create an additional error in the high voltage definition. Accordingly, an accurate gain regulation may be used to keep the high voltage definition within the limit of 1 kiloelectronvolt (keV) from the nominal value. In some embodiments, the gain may be within 0.25% of the nominal gain. In such scenarios, the reference detector 18 may not be affected by the measurement environment. Accordingly, the detector 18 count rate may not change in a significant manner, when such a regulation is used.

A regulation loop may adjust for small deviations from the nominal values. In such a case, the gain of the detector 18 may vary slowly, due to temperature, aging, etc. Therefore, the gain stabilization loop can run slowly, enabling the acquisition of statistics and accurate gain stabilization.

Stabilization can be provided based upon a small radioisotopic check source (e.g., radiocaesium (e.g., Caesium-137 (Cs-137) check source) or by using the position of fluorescent peak 42. In the first case, the radioisotopic check source can create a background under the high energy peak 44. This background may be subtracted using a background measurement that is measured during calibration of the tool 01'.

Another possibility is to consider an extra window on the right side of right window 122 (RW) and use it to subtract the background. However, the radioisotopic check source background will likely be small respective to the high energy tail 44. Accordingly, if the radioisotopic background is not subtracted, it may only slightly reduce the sensitivity of the high voltage on the form factor (FF).

Further, if desired, it is also possible to increase energy of the fluorescent peak 42 without using an additional radioactive source. For example, in some embodiments, the end of the filter 62 may be covered by high Z (high atomic number) material with higher K-edge (e.g., binding energy of the K shell electron of an atom), such as gold, bismuth, etc. When covered with a proper thickness, this material may act to block fluorescents caused by the excitation of the tungsten coming from the filter 62.

When regulation of the gain is not accurate enough, the high voltage of the generator source 16 may vary within 1 keV from the nominal value. This may cause variation of the total counts that exceeds 1%. In such a scenario, it may be beneficial to use the measured current on the target 20 for normalization of measurement (e.g., counts) of the detector 18. For example, when accurate gain stabilization is difficult to obtain, the form factor may be adjusted by a ratio of total counts and current measured at the target 20 ($I_{Target}$).

The sum of window counts LW+RW do not depend strongly on the gain change. If gain of the detector is larger than nominal, the peak of the spectrum is shifted right, and apparent high voltage defined from the original form factor will be larger than real one. Meantime, for a fixed target current, the total counts of LW+RW will be less than expected, the real high voltage is smaller than apparent one. And vice versa, if gain is less than nominal, the apparent high voltage will be less than real one, and sum of the window counts, LW+RW, will be more than expected for the measured apparent high voltage and target current. Therefore, the ratio of total counts over the current for the apparent fixed high voltage is an indicator of gain shift. Thus, adjusting the form factor to keep it stable may result in stabilization of the generator high voltage.

Accordingly, the form factor may be adjusted according to:

$$FF = \frac{LW - RW}{LW + RW} + c \frac{LW + RW}{I_{Target}}$$

where c is a discernable constant.

When an axis of the reference detector 18 crystal 26 coincides with an axis of the generator source 16, as shown in FIG. 4, the regulation procedure is independent of beam spot movement on the target 20. Further, the effects of gain shift may be partially cancelled by the measurement detectors. As mentioned above, increase of high voltage may result in higher total counts under the high energy peak 44, resulting in the normalization factor increasing. Additionally, the measurement detector counts also increase due to the higher effective energy of the source photons. Therefore, the normalized counts may be less affected by gain shift than defined high voltage or normalization factors (e.g., total counts).

By regulating X-ray generation in logging tools during a downhole application, more accurate density and/or photoelectric factor measurements may be obtained. Accordingly, controlling a generator 16 of an X-ray system 14 of the logging tool 01' based upon a normalized difference between a plurality of windows of a high energy peak of spectrum data obtained by a reference detector 18, may result in stabilization of the source 16. As a result, increased accuracy in density and/or photoelectric factor measurements may be obtained, enabling decision makers to manage the wellbore 03 to more effectively produce hydrocarbons, complete the well, or perform any other suitable wellbore 03 management.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method comprising:
producing a stream of photons in an X-ray generator;
passing at least a portion of the stream of photons through a channel that connects the X-ray generator to a reference detector;
identifying a first peak in a spectrum measured by the reference detector;
deriving a form factor of the first peak based at least in part on a difference between a first subset of the first peak and a second subset of the first peak; and
defining a subsequent output of the X-ray generator based at least in part on the form factor.

2. The method of claim 1, wherein the difference between the first subset and the second subset portion is normalized.

3. The method of claim 1, wherein the first subset is at a higher energy portion of the spectrum than the second subset.

4. The method of claim 1, wherein the form factor is adjusted based upon a current measured at a target of the X-ray system.

5. The method of claim 1, wherein the channel comprises a filter that prevents a low energy part of the stream of photons from reaching the reference detector.

6. The method of claim 5, wherein the filter is excited by the stream of photons and generates a fluorescent peak in the spectrum.

7. The method of claim 6, wherein the subsequent output is based at least in part on a peak position of the fluorescent peak.

8. The method of claim 7, wherein the fluorescent peak is at a lower energy than the first peak.

9. The method of claim 5, wherein the filter is coated with a material that prevents at least a portion of fluorescent photons generated by the filter when the filter is excited by the stream of photons.

10. A system, comprising:
an X-ray generator;
a reference detector that is connected to the X-ray generator via a channel;
a controller that regulates a subsequent output of the X-ray generator based at least in part on an analysis of a first peak in a spectrum measured by the reference detector, wherein the analysis of the first peak comprises:
dividing the first peak into a plurality of windows; and
deriving a form factor of the first peak based at least in part on a difference between a first window of the plurality of windows and a second window of the plurality of windows, wherein the first window comprises a higher energy portion of the first peak than the second window.

11. The system of claim 10, wherein the form factor is normalized based at least in part on a sum of the first window and the second window.

12. The system of claim 11, wherein the form factor is adjusted based at least in part on a current measured at a target of the X-ray system.

13. The system of claim 10, wherein the channel comprises a filter that prevents a low energy part of a stream of photons from reaching the reference detector.

14. The system of claim 13, wherein the filter is excited by the stream of photons and generates a fluorescent peak in the spectrum.

15. The system of claim 14, wherein the subsequent output is based at least in part on a peak position of the fluorescent peak.

16. The system of claim 14, wherein the first peak is at a higher energy than the fluorescent peak.

17. The system of claim 14, wherein the filter is coated with a material that blocks at least a portion of fluorescent photons generated by the filter when the filter is excited by the stream of photons.

18. A downhole logging tool, comprising:
an X-ray generator;
a reference detector that is connected to the X-ray generator via a direct channel; and
a controller that regulates a subsequent output of the X-ray generator based upon an analysis of a high energy peak in a spectrum measured by the reference detector, wherein the analysis of the high energy peak comprises:
dividing the high energy peak into a plurality of windows; and
deriving a form factor of the high energy peak based at least in part on a normalized difference between a first count of a left window of the plurality of windows and a second count of a right window of the plurality of windows.

19. The downhole logging tool of claim 18, further comprising:
a shield surrounding the reference detector that is configured to block.

20. The downhole logging tool of claim 18, wherein the downhole logging tool is a wireline tool or a logging-while-drilling (LWD) tool.

* * * * *